(12) United States Patent
Schwinn et al.

(10) Patent No.: US 10,711,735 B2
(45) Date of Patent: Jul. 14, 2020

(54) ARRANGEMENT FOR REGENERATING AN ACTIVATED CARBON FILTER

(71) Applicant: Eagle Actuator Components GmbH & Co. KG, Heppenheim (DE)

(72) Inventors: Marc Schwinn, Oberzent-Rothenberg (DE); Volker Daume, Hirschhorn (DE); Lukas Göcke, Weinheim (DE)

(73) Assignee: Eagle Actuator Components GmbH & Co. KG, Heppenheim (DE)

( * ) Notice: Subject to any disclaimer, the term of this patent is extended or adjusted under 35 U.S.C. 154(b) by 0 days.

(21) Appl. No.: 16/406,102

(22) Filed: May 8, 2019

(65) Prior Publication Data

US 2019/0345898 A1 Nov. 14, 2019

(30) Foreign Application Priority Data

May 9, 2018 (DE) .......................... 10 2018 111 116

(51) Int. Cl.
 *F02M 25/08* (2006.01)
 *B01D 53/04* (2006.01)

(52) U.S. Cl.
 CPC ..... *F02M 25/0809* (2013.01); *B01D 53/0446* (2013.01); *B01D 53/0454* (2013.01); *F02M 25/089* (2013.01); *F02M 25/0818* (2013.01); *F02M 25/0836* (2013.01); *F02M 25/0872* (2013.01); *B01D 2253/102* (2013.01); *B01D 2257/7022* (2013.01); *B01D 2259/4516* (2013.01); *F02M 2025/0845* (2013.01)

(58) Field of Classification Search
 CPC .......... F02M 25/0809; F02M 25/0818; F02M 25/0836; F02M 25/0872; F02M 2025/0845

USPC ................. 123/518–520; 73/114.39
See application file for complete search history.

(56) References Cited

U.S. PATENT DOCUMENTS

| | | | | |
|---|---|---|---|---|
| 6,161,423 A * | 12/2000 | Okuma | .............. | F02M 25/0818 123/520 |
| 6,604,407 B2 * | 8/2003 | Kano | ................. | F02M 25/0809 73/114.38 |
| 7,216,637 B2 * | 5/2007 | Uchida | .............. | F02M 25/0818 123/198 D |

(Continued)

FOREIGN PATENT DOCUMENTS

DE   102015221536 A1   5/2017
DE   102016210570 A1   12/2017

(Continued)

*Primary Examiner* — Erick R Solis
(74) *Attorney, Agent, or Firm* — Katterle Nupp LLC; Paul Katterle; Robert Nupp

(57) ABSTRACT

An arrangement is provided for use with an internal combustion engine. The arrangement includes an intake tract for the internal combustion engine and a valve that is fluidly connected to the intake tract. An activated carbon filter is located upstream from the intake tract and the valve. The valve is connected to the carbon filter by an intake line. When the valve is open, fluid can flow from the activated carbon filter into the intake tract. A pressure sensor measures upstream pressure (p1) in the intake line. A pump helps generate the pressure (p1) in the intake line. The valve is connected to the intake tract so they cooperate together to form a cavity that is connected to the intake line such that when the valve is closed, the pressure in the cavity is the pressure (p1).

12 Claims, 4 Drawing Sheets

(56) References Cited

U.S. PATENT DOCUMENTS

| | | | |
|---|---|---|---|
| 7,409,947 B2* | 8/2008 | Koyama | F02D 41/0045 |
| | | | 123/519 |
| 8,844,561 B2 | 9/2014 | Keller et al. | |
| 2005/0044938 A1* | 3/2005 | Tsuruta | F02M 25/0818 |
| | | | 73/114.41 |
| 2015/0159597 A1 | 6/2015 | Woods et al. | |
| 2016/0258389 A1* | 9/2016 | Makino | F02M 25/0836 |
| 2016/0258390 A1* | 9/2016 | Makino | B60K 15/03504 |
| 2017/0167415 A1* | 6/2017 | Tochihara | F02M 35/10222 |
| 2017/0184057 A1 | 6/2017 | Weigl et al. | |
| 2017/0218886 A1* | 8/2017 | Jackson | F02M 25/0809 |
| 2018/0372030 A1* | 12/2018 | Achleitner | F02M 25/089 |
| 2019/0353119 A1* | 11/2019 | Choi | F02M 25/0809 |
| 2020/0095958 A1* | 3/2020 | Teramoto | F02M 25/0836 |

FOREIGN PATENT DOCUMENTS

| | | |
|---|---|---|
| DE | 112015006483 T5 | 1/2018 |
| DE | 102016221907 B3 | 4/2018 |
| DE | 102016225206 A1 | 6/2018 |
| WO | WO2012098458 A2 | 7/2012 |
| WO | NO2016169611 A1 | 10/2016 |

* cited by examiner

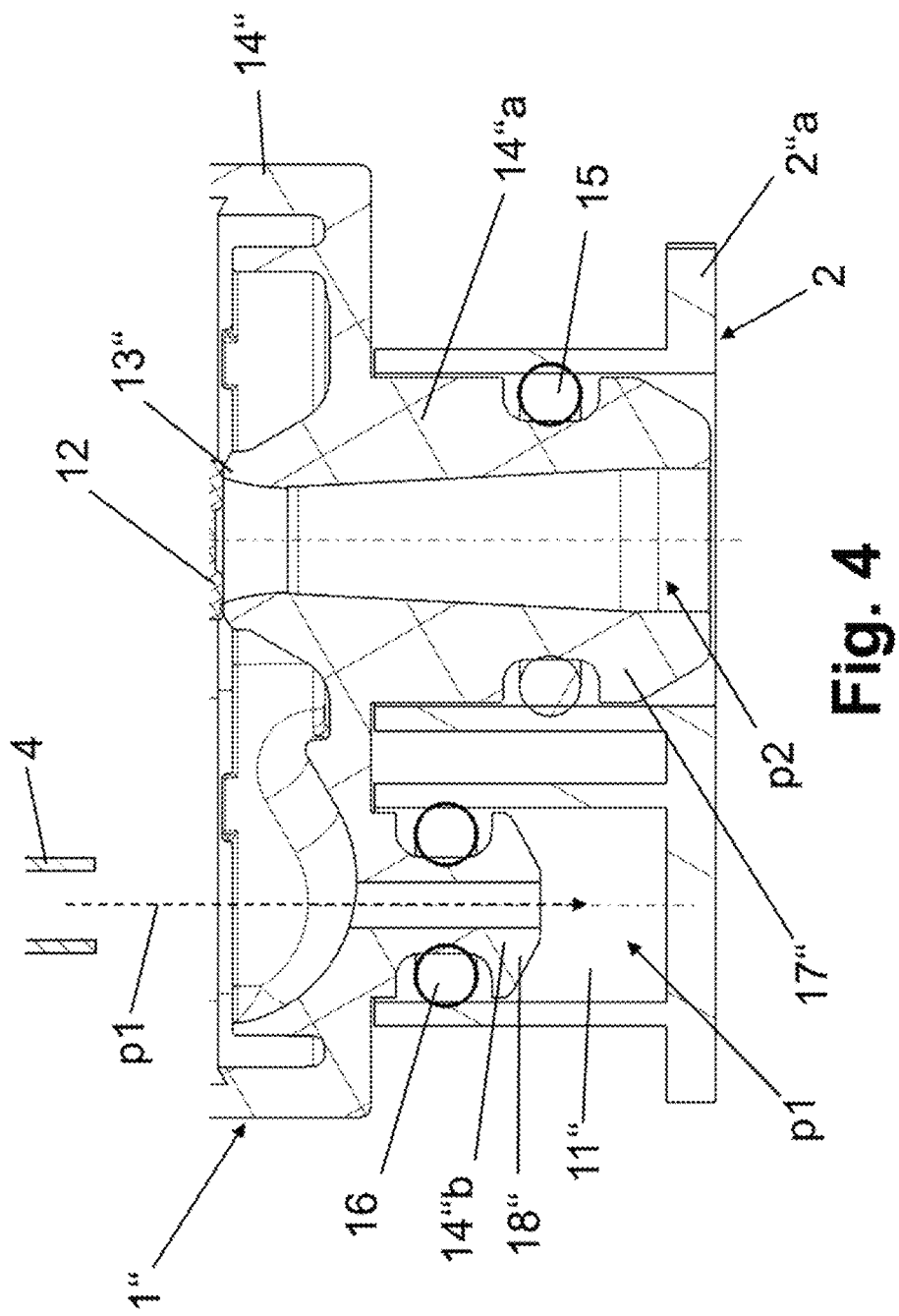

ARRANGEMENT FOR REGENERATING AN ACTIVATED CARBON FILTER

CROSS-REFERENCE TO RELATED APPLICATION(S)

This application claims priority under 35 U.S.C. § 119 to: German Patent Application No. 10 2018 111 116.9, filed on May 9, 2018, which is herein incorporated by reference.

TECHNICAL FIELD

The present disclosure relates to an arrangement for regenerating an activated carbon filter.

BACKGROUND

It is known for adsorbing hydrocarbons in activated carbon filters, which have escaped from a fuel tank. By rinsing the activated carbon filter, the hydrocarbons can be fed into an internal combustion engine.

Through a suction pipe of an internal combustion engine, a negative pressure can be generated in an activated carbon filter when a tank-venting valve of a line is opened to the activated carbon filter.

The negative pressure is then built up in the activated carbon filter. Due to the negative pressure, ambient air is sucked into the activated carbon filter and the activated carbon is desorbed. The activated carbon filter is regenerated in this way.

A mixture of air and desorbed hydrocarbons can then be fed via the line to the internal combustion engine.

In that regard, a passive flushing system is created by the negative pressure, since a regeneration pressure is generated by the negative pressure of a motor, namely an already existing internal combustion engine.

DE 10 2016 221 907 B3 discloses a passive flushing system, specifically a method for controlling tank venting of a fuel tank, in which a flushing mass flow is fed through a line. An activated carbon filter and a tank-venting valve are arranged in the line.

To control the flushing mass flow through the line, the hydrocarbon loading of the activated carbon filter is determined and multiplied by a flushing mass flow. The value obtained by the multiplication is compared with a threshold value. If the threshold value is undershot, the flushing mass flow is reduced.

From DE 11 2015 006 483 T5 an electric evaporation pump with an encapsulated electric motor has become known. In that regard, an active flushing system has become known by this document, in which the regeneration pressure can be generated by a pump. From US 2015/0159597 A1 an active system with an independently operating pump has also become known.

Increased regulatory emission regulations require a motor vehicle to comprise reliable on-board detection of any gas leaks within the entire flushing system for an activated carbon filter during operation. This is associated with the problem of detecting a gas leak or leakage between a valve and the intake tract of an engine.

The disclosure therefore relates to providing an arrangement with a valve which is connected to the intake tract of a motor so that leakage is detected as easily and reliably as possible.

SUMMARY

In accordance with the disclosure, an arrangement is provided for use with an internal combustion engine. The arrangement includes an intake tract for the internal combustion engine. An openable and closeable valve is fluidly connected to the intake tract for the internal combustion engine. An activated carbon filter is located upstream from the intake tract and the valve. An intake line is connected between the valve and the activated carbon filter such that when the valve is open, fluid can flow from the activated carbon filter into the intake tract. A pressure sensor measures upstream pressure (p1) in the intake line. A pump helps generate the pressure (p1) in the intake line. The valve is connected to the intake tract so they cooperate together to form a cavity that is connected to the intake line such that when the valve is closed, the pressure in the cavity is the pressure (p1).

BRIEF DESCRIPTION OF THE DRAWINGS

The features, aspects, and advantages of the present disclosure will become better understood with regard to the following description, appended claims, and accompanying drawings where:

FIG. 4 shows another arrangement according to FIG. 2, wherein a further valve is used with a differently shaped valve housing, in which the cavity is formed and arranged laterally next to a nozzle.

DETAILED DESCRIPTION OF ILLUSTRATIVE EMBODIMENTS

Figure 1:
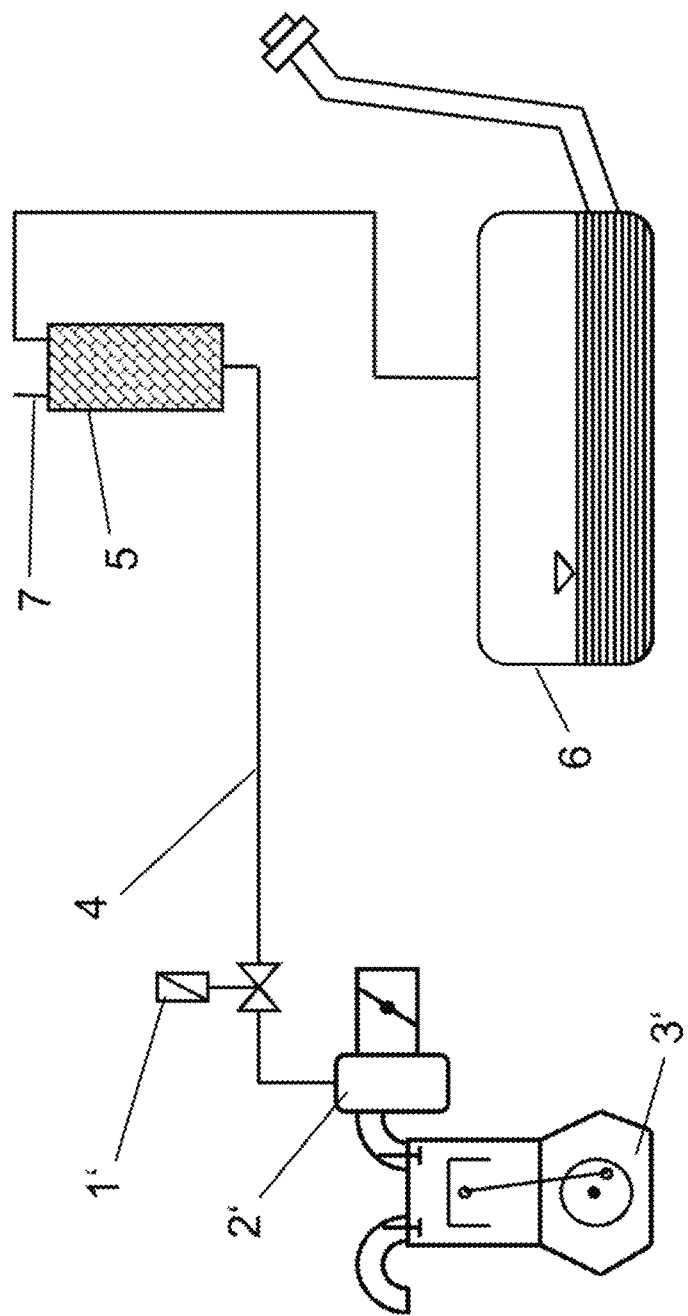
FIG. 1 shows an arrangement of the prior art, in which a valve is connected to the intake tract of an internal combustion engine, wherein through the valve, a suction line can be shut off, which opens into an activated carbon filter.

According to the disclosure, it has first been recognized that a pump for regenerating an activated carbon filter can be used in an active system for flushing, in addition to a motor, in particular an internal combustion engine. It has been recognized that the valve must be suitably connected to the intake tract of the engine or internal combustion engine. It has also been recognized that leakage testing is often possible only up to the armature of a valve, which moves a membrane up and down.

It has also been recognized that leakage safety could be achieved by non-releasable mechanical connections, such as welding, non-releasable clipping or screwing. Finally, however, it has been recognized that the valve housing must be configured at a critical interface to the intake tract so that a regeneration pressure present in the system can be used to detect a potential leakage.

Specifically, it has been recognized here that the regeneration pressure must be introduced into a closed cavity between the valve housing and the intake tract. A pressure sensor present in the system then detects a possible destruction or damage to this closed cavity. For this purpose, a kind of test pressure is generated with the closed sealing seat of the valve, which is only correct when the system is sealed.

If there are any deviations, the faulty interface will be detected as required by an on-board diagnostic device or control device.

According to the disclosure, the following advantages are achieved: A simple arrangement is created by extensive use of components or physical quantities that are already present in the assembly, such as regeneration flow and pressure sensor. There are no additional attachments and/or interfaces required. There is only a small space required and weight and cost can be reduced.

The cavity could be arranged downstream in the direction of the intake tract after the sealing seat of the valve. Thus, a regeneration pressure present in the system can be used for detecting a potential leakage downstream, namely after the valve seat or after the armature.

The valve could have a membrane which can be applied to the sealing seat of the valve for closing the valve and which can be lifted from the sealing seat for opening the valve. Such a membrane can be moved up and down by an armature. The membrane is preferably made of an elastomer and can therefore rest tightly against a sealing seat. The cavity is in any case arranged on the side of the membrane which faces the intake tract of the engine.

The intake tract could have a connecting housing, in which at least a part of the valve housing is accommodated. In this configuration, the valve is securely mounted on the intake tract, avoiding breakages. The cavity can be arranged within the connecting housing and facing the intake tract.

Against this background, a first portion of the valve housing could be sealed against the connecting housing by means of a first sealant, wherein a second portion of the valve housing is sealed against the connecting housing by means of a second sealant and wherein the cavity is at least partially located between the two sealants. The cavity is thereby substantially embedded in the connecting housing, wherein the outer walls of the valve housing and the inner walls of the connecting housing at least partially delimit the cavity.

The cavity could at least partially comprise an annular space or be formed as such. An annular space extends symmetrically around a portion of the valve housing and stresses it evenly in a mechanical manner. This avoids stress peaks on the valve body.

A first portion of the valve housing could be sealed against the connecting housing by a first sealant, wherein a second portion of the valve housing is sealed against the connecting housing by a second sealant and wherein the cavity and/or the second portion is or are laterally adjacent to the first portion. In this way, two parallel nozzles of the valve housing can be formed, which in each case protrude into a receptacle of the connecting housing associated with the respective nozzle and which can be sealed. Thus, a cavity can be created, which is located laterally next to a nozzle, which leads fluidly to the intake tract.

A motor vehicle could have an arrangement of the type described herein, with an on-board control device for detecting leakage in the arrangement. The control device acts as a diagnostic device for detecting a leak.

FIG. 1 shows an arrangement of the prior art, in which a valve 1' is connected to the intake tract 2' of an internal combustion engine 3', wherein through the valve 1' a suction line 4 can be shut off, which opens into an activated carbon filter 5. From a fuel tank 6 hydrocarbons escape into the activated carbon filter 5 and are adsorbed there.

If a negative pressure is generated by the internal combustion engine 3' and the valve 1' is opened, a negative pressure is also generated in the activated carbon filter 5.

Ambient air is then sucked through the air line 7 into the activated carbon filter 5, wherein the activated carbon filter 5 is regenerated and the hydrocarbons are fed into the internal combustion engine 3'. In this respect, FIG. 1 shows a passively operating flushing system.

Figure 2:
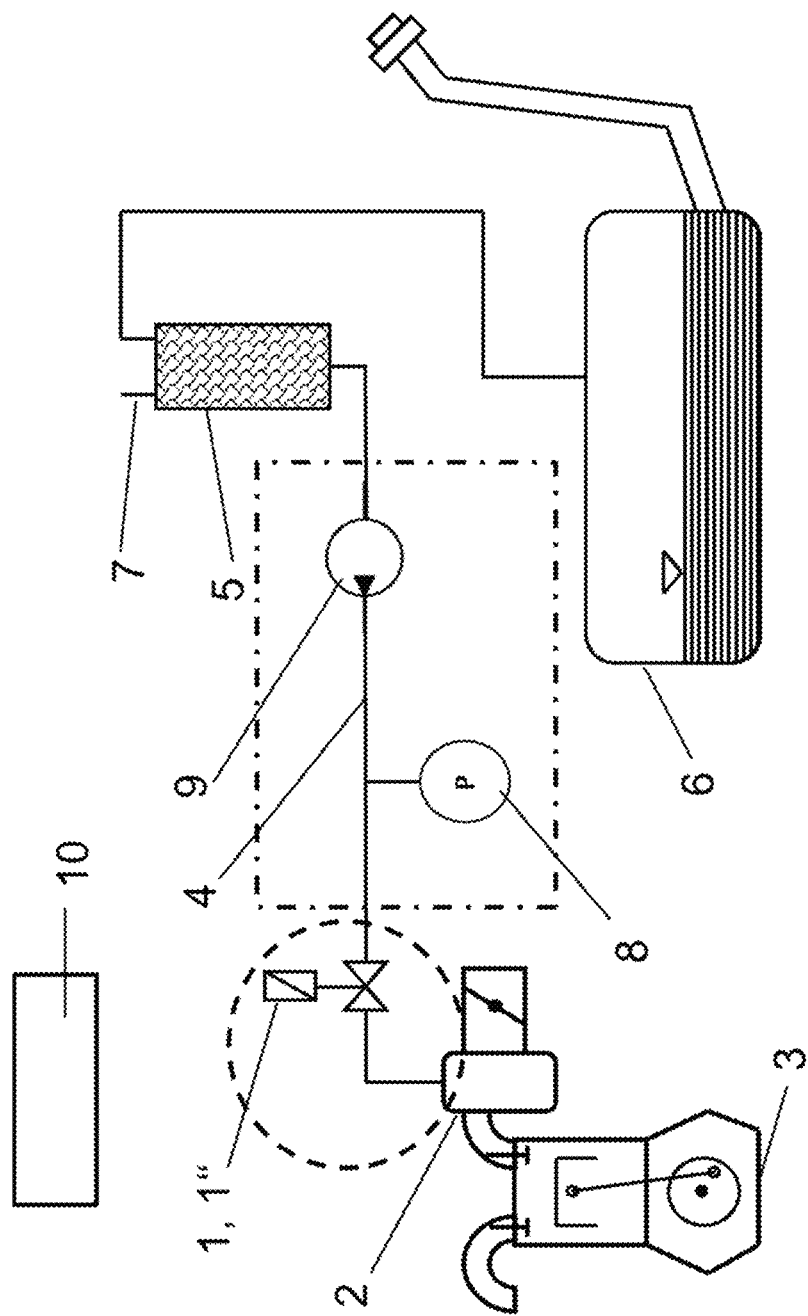
FIG. 2 shows an arrangement in which a valve is connected to the intake tract of an internal combustion engine, wherein an intake line is shut off by the valve, which opens into an active carbon filter and wherein the intake line is assigned to a pressure sensor and a pump.

FIG. 2 also shows an arrangement in which a valve 1 is connected to the intake tract 2 of an internal combustion engine 3, wherein an intake line 4 can be shut off by the valve 1, which opens into an activated carbon filter 5. A pressure sensor 8 and a pump 9 are, however, assigned to the intake line 4.

Since the internal combustion engine 3 according to FIG. 2 generates a lower vacuum at its intake tract 2, i.e. a lower negative pressure than the combustion engine 3', an active flushing system is required in order to regenerate an activated carbon filter 5. For this purpose, a pump 9 is provided. Furthermore, a pressure sensor 8 is provided, which detects a pressure in the intake line 4. A control device 10 (EVAP, Evaporative Emission Control System or vehicle on-board diagnostics) ensures reliable operation of the arrangement according to FIG. 2.

Figure 3:
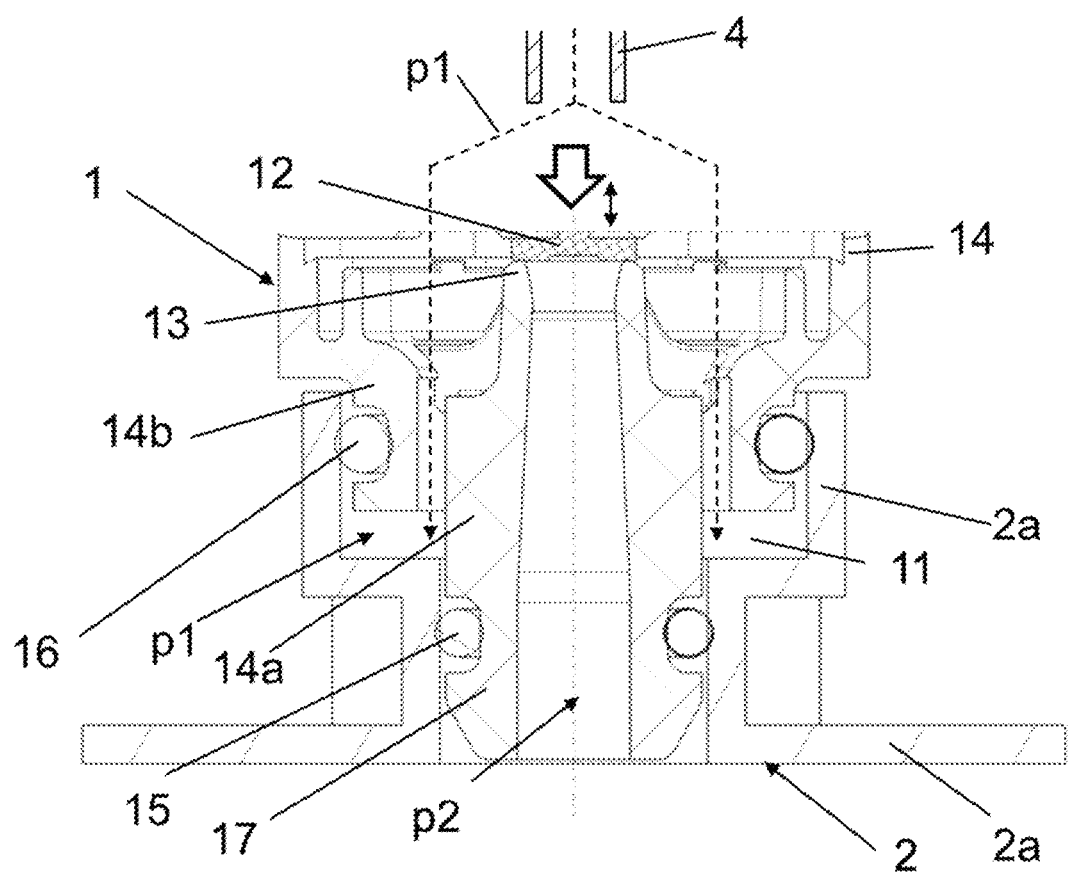
FIG. 3 shows the arrangement according to FIG. 2, wherein the valve housing of the valve is connected to the housing of the intake tract so that a cavity is provided in which a regeneration pressure prevails.

FIG. 3 shows a detail of the arrangement according to FIG. 2, comprising the intake tract 2 of the internal combustion engine 3, the openable and closeable valve 1, which is fluidly connected downstream to the intake tract 2 of the internal combustion engine 3 and the intake line 4, which is arranged between the valve 1 and the activated carbon filter 5. The suction line 4 opens upstream to the valve 1, so that when the valve 1 is open, fluid can be introduced from the activated carbon filter 5 into the intake tract 2. The arrangement further comprises the pressure sensor 8 for measuring the upstream pressure p1 in the intake pipe 4 and a pump 9 which generates the pressure p1 in the intake pipe 4. In this respect, the pressure p1 is the regeneration pressure.

FIG. 3 shows that the valve 1 is connected to the intake tract 2 and partially integrated into the same so that a cavity 11 is provided, in which the pressure p1 prevails when the valve 1 is closed.

A fluid can enter the cavity 11 from the suction line 4 according to the dashed lines in FIG. 3 and generate the pressure p1 there when the valve 1 is closed.

The cavity 11 is arranged downstream in the direction of the intake tract 2 after the sealing seat 13 of the valve 1. The valve 1 has a membrane 12 which can be applied to the sealing seat 13 of the valve 1 for closing the valve 1 and which can be lifted from the sealing seat 13 for opening the valve 1. Specifically, it is shown that the membrane 12 closes the sealing seat 13.

The intake tract 2 has a connecting housing 2a, in which at least part of the valve housing 14 is received. For this purpose, the connecting housing 2a is designed like a pot. The pot has an upper portion with a larger diameter and a lower portion with a smaller diameter. The areas are separated by a step.

A first portion 14a of the valve housing 14 is sealed against the connecting housing 2a, namely against the inner wall of the lower portion by means of a first sealant 15, wherein a second portion 14b of the valve housing 14 is sealed against the connecting housing 2a, namely against the inner wall of the upper portion by means of a second sealant 16. The cavity 11 is at least partially between the two sealants 15, 16. The sealants 15, 16 are designed as O-rings.

The cavity 11 at least partially comprises an annular space. The annular space surrounds a nozzle 17 of the valve housing 14.

The cavity 11 is fluidly connected to the suction line 4 when the valve 1 is closed, so that in the latter the pressure p1, namely the regeneration pressure, prevails.

FIG. 3 shows a detail of the arrangement according to FIG. 2, namely the critical interface between the valve 1 and the intake tract 2. The critical interface is shown in FIG. 2 by a dashed circle.

The existing pump 9 and the existing pressure sensor 8 are used and the valve 1 is integrated into the intake tract 2. A closed cavity 11 is provided between a part of the intake tract and a part of the valve 1.

When the valve 1 is closed, that is, when the membrane 12 rests on the sealing seat 13, a regeneration pressure is exerted on the membrane 12 by the pump 9, which is schematically represented by the hollow arrow in FIG. 3.

In this respect, the pressure sensor 8 measures an overpressure in the intake line 4. If the measured overpressure is not as high as expected, there must be a leak.

Thus, a leak can be detected, which could have been caused by a valve break, for example.

If the cavity 11 is damaged and thus no longer sealed, the pressure sensor 8 no longer measures the pressure value p1 expected in the case of an intact arrangement.

A motor vehicle, not shown, has an arrangement of the type described here, wherein an on-board control device 10 is provided for detecting a leakage in the arrangement.

FIG. 4 shows a detail of the arrangement according to FIG. 2, comprising the intake tract 2 of the internal combustion engine 3, and another openable and closeable valve 1", which is fluidly connected downstream to the intake tract 2 of the internal combustion engine 3 and the intake line 4, which is arranged between the valve 1 and the activated carbon filter 5.

The suction line 4 opens upstream into the valve 1", so that fluid can be introduced from the activated carbon filter 5 into the intake tract 2 when the valve 1" is open. The arrangement further comprises the pressure sensor 8 for measuring the upstream pressure p1 in the intake pipe 4 and a pump 9 which generates the pressure p1 in the intake pipe 4. In this respect, the pressure p1 is the regeneration pressure.

FIG. 4 shows that the valve 1" is connected to the intake tract 2 and is partially integrated into the same so that a cavity 11" is created in which the pressure p1 prevails when the valve 1" is closed.

A fluid can enter the cavity 11" from the suction line 4 according to the dashed line in FIG. 4 and generate the pressure p1 there when the valve 1" is closed.

The cavity 11" is arranged downstream in the direction of the intake tract 2 after the sealing seat 13" of the valve 1". The valve 1" has a membrane 12, which can be applied to the sealing seat 13" of the valve 1" for closing the valve 1" and which can be lifted from the sealing seat 13" for opening the valve 1". Specifically, it is shown that the membrane 12 closes the sealing seat 13".

The intake tract 2 has a connecting housing 2"a, in which at least part of the valve housing 14" is received. The connecting housing 2"a is designed like a pot.

A first portion 14"a of the valve housing 14" is sealed against the connecting housing 2"a by means of a first sealant 15, wherein a second portion 14"b of the valve housing 14" is sealed against the connecting housing 2"a by means of a second sealant 16.

The cavity 11" and the second portion 14"b are laterally adjacent to the first portion 14"a.

The first portion 14"a of the valve housing 14", namely a nozzle 17", is sealed against the connecting housing 2"a, namely against its inner wall, by means of the first sealant 15.

The second portion 14"b of the valve housing 14", namely a parallel nozzle 18", is sealed against the connecting housing 2"a, namely against its inner wall, by means of a second sealant 16.

The cavity 11" is here laterally adjacent to the nozzle 17". The sealants 15, 16 are designed as O-rings.

The cavity 11" is fluidly connected to the suction line 4 when the valve 1" is closed, so that in this the pressure p1, namely the regeneration pressure, prevails.

FIG. 4 also shows a detail of the arrangement according to FIG. 2, namely the critical interface between the valve 1" and the intake tract 2. The critical interface is shown in FIG. 2 by a dashed circle.

The existing pump 9 and the existing pressure sensor 8 are used and the valve 1" is integrated into the intake tract 2. A closed cavity 11" is created between a part of the intake tract 2 and a part of the valve 1".

When the valve 1" is closed, that is, when the membrane 12 rests on the sealing seat 13", a regeneration pressure is exerted on the membrane 12 by the pump 9.

In this respect, the pressure sensor 8 measures an overpressure in the intake line 4. If the measured overpressure is not as high as expected, there must be a leak.

Thus, a leak can be detected, which could have been caused by a valve break, for example.

If the cavity 11" is damaged and thus no longer is tight, the pressure sensor 8 will no longer measure the pressure value p1 expected in an intact arrangement.

A motor vehicle, not shown, has an arrangement of the type described here, wherein an on-board control device 10 is provided for detecting a leakage in the arrangement.

It is to be understood that the description of the foregoing exemplary embodiment(s) is (are) intended to be only illustrative, rather than exhaustive. Those of ordinary skill will be able to make certain additions, deletions, and/or modifications to the embodiment(s) of the disclosed subject matter without departing from the spirit of the disclosure or its scope.

What is claimed is:

1. An arrangement for use with an internal combustion engine, the arrangement comprising:
   an intake tract for the internal combustion engine;
   an openable and closeable valve which is fluidly connected to the intake tract for the internal combustion engine;
   an activated carbon filter located upstream from the intake tract and the valve;
   an intake line, which is connected between the valve and the activated carbon filter such that when the valve is open, fluid can flow from the activated carbon filter into the intake tract;
   a pressure sensor for measuring upstream pressure (p1) in the intake line; and
   a pump which helps generate the pressure (p1) in the intake line; and
   wherein the valve is connected to the intake tract so they cooperate together to form a cavity that is connected to the intake line such that when the valve is closed, the pressure in the cavity is the pressure (p1).

2. The arrangement according to claim 1, wherein the cavity is arranged downstream, toward the intake tract (2), and after the sealing seat of the valve.

3. The arrangement according to claim 2, wherein the valve has a membrane which can be applied to the sealing seat of the valve for closing the valve and which can be lifted from the sealing seat for opening the valve.

4. The arrangement according to claim 1, wherein the intake tract includes a connecting housing, in which at least a part of a valve housing of the valve is received.

5. The arrangement according to claim 4, wherein a first portion of the valve housing is sealed against the connecting housing by a first sealant, wherein a second portion of the valve housing is sealed against the connecting housing by a second sealant, and wherein the cavity is at least partially located between the two sealants.

6. The arrangement according to claim 4, wherein a first portion of the valve housing is sealed against the connecting housing by a first sealant, wherein a second portion of the valve housing is sealed against the connecting housing by a second sealant, and wherein the first portion is located laterally next to one or both of the cavity and the second portion.

7. The arrangement of claim 6, wherein the first portion is located laterally next to both the cavity and the second portion.

8. The arrangement according to claim 1, wherein the cavity at least partially comprises an annular space.

9. The arrangement according to claim 1, further comprising a control device for detecting a leakage in the arrangement.

10. The arrangement according to claim 9, wherein the control device is operable to determine that there is a leak in the arrangement if the pressure (p1) measured by the pressure sensor deviates from an expected pressure.

11. The arrangement of claim 10, wherein the valve includes a sealing seat and a membrane movable between open and closed positions, wherein when the membrane is in the closed position, the membrane presses against the sealing seat to close the valve and when the membrane is in the open position, the membrane is spaced from the sealing seat to open the valve, and wherein if damage to the valve downstream of the valve seat causes the cavity to no longer be sealed, the pressure (p1) will fall below the expected pressure, thereby causing the control device to determine that a leak has occurred.

12. The arrangement according to claim 1, wherein fluid may enter the cavity from the intake line when the valve is closed.

* * * * *